(12) United States Patent
Boudreau et al.

(10) Patent No.: US 6,731,853 B2
(45) Date of Patent: May 4, 2004

(54) MULTIPLE FIBER CHIP CLAMP

(75) Inventors: Robert A. Boudreau, Corning, NY (US); Chris P. Brophy, Corning, NY (US); Lawrence Charles Hughes, Jr., Corning, NY (US); Mark F. Krol, Fainted Post, NY (US); Deepukumar M. Nair, Corning, NY (US); Songsheng Tan, Corning, NY (US); Aniruddha S. Weling, Corning, NY (US)

(73) Assignee: Corning Incorporarted, Corning, NY (US)

( * ) Notice: Subject to any disclaimer, the term of this patent is extended or adjusted under 35 U.S.C. 154(b) by 38 days.

(21) Appl. No.: 09/928,656

(22) Filed: Aug. 14, 2001

(65) Prior Publication Data
US 2002/0131752 A1 Sep. 19, 2002

Related U.S. Application Data
(60) Provisional application No. 60/276,337, filed on Mar. 16, 2001.

(51) Int. Cl.$^7$ ................................................ G02B 6/00
(52) U.S. Cl. ........................... 385/137; 385/52; 385/67
(58) Field of Search ............................ 385/137, 52, 59, 385/63, 65, 67, 71, 77

(56) References Cited

U.S. PATENT DOCUMENTS

| | | | | | |
|---|---|---|---|---|---|
| 4,046,454 | A | * | 9/1977 | Pugh, III | 385/59 |
| 4,988,310 | A | * | 1/1991 | Bright et al. | 439/342 |
| 5,443,591 | A | * | 8/1995 | Tsai | 439/342 |
| 5,454,727 | A | * | 10/1995 | Hsu | 439/263 |
| 5,692,079 | A | * | 11/1997 | Iso | 385/59 |
| 5,734,768 | A | * | 3/1998 | Kim et al. | 385/52 |
| 2001/0055460 | A1 | * | 12/2001 | Steinberg | 385/137 |
| 2002/0131703 | A1 | * | 9/2002 | Velikov | 385/35 |

* cited by examiner

*Primary Examiner*—Hae Moon Hyeon
(74) *Attorney, Agent, or Firm*—Gregory V. Bean

(57) ABSTRACT

An optical fiber clamp that precisely aligns and clamps multiple optical fibers in multi-channel freespace optical systems, eliminates multiple parts and simplifies assembly. Multiple wafers each having an array of holes passing therethrough, are aligned with respect to each other. Optical fibers are passed through the holes, and at least one of the wafers is moved laterally with respect to the other wafers, so that sidewalls of the holes clamp the optical fibers into a desired location.

18 Claims, 7 Drawing Sheets

MULTIPLE FIBER CHIP CLAMP

The present application claims priority under 35 U.S.C. §119(e) to U.S. Provisional Application 60/276,337 filed on Mar. 16, 2001, which is hereby incorporated by reference in its entirety for all purposes.

BACKGROUND OF THE INVENTION

1. Field of the Invention

The present invention relates to an apparatus for aligning and clamping multiple optical fibers in an electro-optical device. More particularly, the present invention relates to a method and apparatus for quickly and inexpensively aligning an (M×N) array of optical fibers into a semiconductor wafer.

2. Description of the Related Art

Multiple channel freespace optical systems require inputs and outputs of optical signals using optical fiber. For systems with small numbers of channels, these fibers can be mechanically routed using v-shaped grooves or other similar mechanisms to hold and align the fibers as a (1×N) array.

Figure 1:
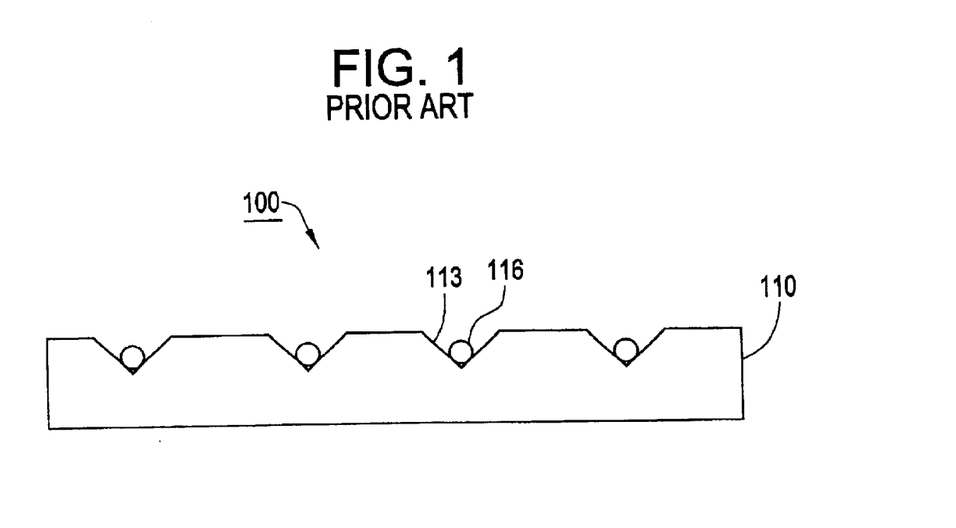
FIG. 1 is a side view of a conventional one-dimensional optical fiber alignment system having a (1×N) array of optical fibers that are aligned using v-shaped grooves.

FIG. 1 is a side view of a conventional one-dimensional optical fiber alignment system 100 having a (1×N) array of optical fibers that are aligned using v-shaped grooves. In this case, a (1×4) array is described. As shown in FIG. 1, a semiconductor wafer 110 has a plurality of v-shaped grooves 113 that each hold a respective one of a plurality of optical fibers 116.

When <100> oriented crystal silicon is used for the semiconductor wafer 110, v-shaped grooves 113 can be easily formed on a top surface of the wafer 110. Ends of the optical fibers 116 are placed in these grooves 113 so that they can be properly aligned. Once in these grooves 113, the optical fibers 116 can be cut and then potted with a glue to be fixed into place. Then a connecting surface, or end face, of the wafer 110 is polished back to provide each of the optical fibers 116 with a clean connective face. The wafer 110 is then aligned as necessary into an optical system.

However in optical systems with a large channel count, it is often desirable to have more optical fibers aligned than would be practical in a (1×N) array. Thus, it is necessary in these systems to arrange the fibers into an (M×N) array. The conventional alignment system achieves this by stacking M (1×N) arrays to form an (M×N) array.

Figure 2:
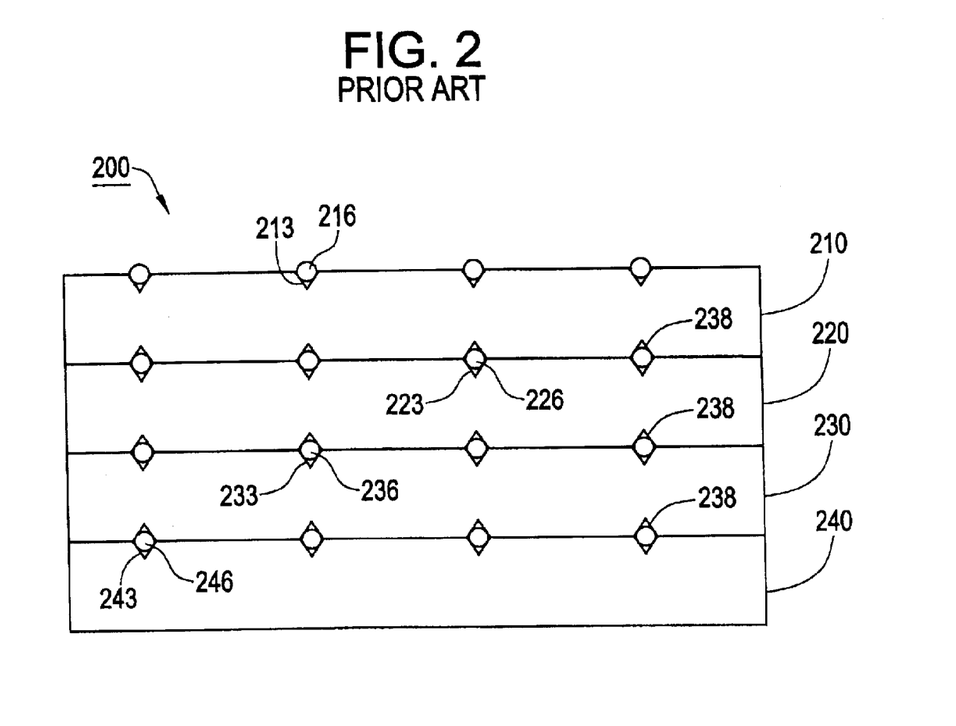
FIG. 2 is a side view of a conventional multi-dimensional optical fiber alignment system having an (M×N) array of optical fibers that are aligned using v-shaped grooves.

FIG. 2 is a side view of a conventional multi-dimensional optical fiber alignment system having an (M×N) array of optical fibers that are aligned using v-shaped grooves. In this case, a (4×4) array is described, made by stacking four (1×4) arrays on top of each other. As shown in FIG. 2, the multi-dimensional optical fiber alignment system 200 includes a plurality of stacked semiconductor wafers 210, 220, 230, and 240. The wafers have v-grooves on both sides thereof, or some other structure, to align the stack of wafers to each other.

Each of wafers 210, 220, 230, and 240 are formed as shown for the (1×N) array in FIG. 1, except for also having the alignment grooves on bottom surfaces thereof. As in the semiconductor wafer 110 of FIG. 1, the first semiconductor wafer 210 includes a plurality of first v-shaped grooves 213 that each hold a respective one of a plurality of first optical fibers 216. Similarly, the second wafer 220 includes a plurality of second v-shaped grooves 223 that each hold a respective one of a plurality of second optical fibers 226. The third wafer 230 includes a plurality of third v-shaped grooves 233 that each hold a respective one of a plurality of third optical fibers 236. Also, the fourth wafer 240 includes a plurality of fourth v-shaped grooves 243 that each hold a respective one of a plurality of fourth optical fibers 246. Also, wafers 210, 220 and 230 are shown as including the v-shaped grooves 238 on respective bottom surfaces thereof, which correspond with respective v-shaped grooves on the upper surfaces of the respective stacked wafers.

However, as the (1×N) arrays are stacked on top of each other, alignment errors between individual wafers rapidly compound, resulting in significant alignment errors. Thus, while the fabrication process of the individual wafers 210, 220, 230, and 240 provides a very good tolerance in the horizontal direction, the stacking process results in a very poor tolerance as the number of stacked wafers increases.

In view of such manufacturing tolerances in the stacking process, special structures and assembly techniques are required to align the array of fibers to the system. However, for multi-channel systems, the use of existing fiber array alignment techniques requires a prohibitively large number of precision alignments per system, as well as numerous fiber holding components to achieve the required level of precision. This can significantly increase fabrication time and cost.

It is therefore desirable to have a system and method for quickly and cheaply aligning large arrays of optical fibers.

SUMMARY OF THE INVENTION

The present invention is therefore directed to multiple fiber chip clamp which substantially overcomes one or more of the problems due to the limitations and disadvantages of the related art.

Therefore, a new apparatus and method has been designed that precisely locates and clamps multiple fibers using precision etched silicon wafers or substrates, that eliminates numerous precision alignments, and dramatically reduces the number of components required to clamp the fibers.

An optical fiber clamp of the present invention includes a first wafer having a first surface with a plurality of first holes formed therethrough; and a second wafer having a second surface with a plurality of second holes formed therethrough, the second surface of the second wafer facing the first surface of the first wafer. The first and second wafers are laterally movable with respect to each other to a clamping position whereby an optical fiber placed through a respective pair of the first and second holes is held stationary against sidewalls of the first and second holes.

For example, the first wafer may be stationary and the second wafer may be laterally movable with respect to the first wafer. As such, the sidewalls of each of the second holes of the second wafer may be covered with a compliant material. The compliant material may comprise one of rubber or plastic.

At least one of the first and second holes may be diamond-shaped, triangular-shaped, or rectangular-shaped.

The first wafer should be sufficiently thick such that when the second wafer is at the point of farthest movement, or in other words at the clamping position, the optical fibers in the second holes are pressed along the same sidewall of respective second holes. Alternatively, the second wafer may be sufficiently thick such that when the second wafer is at the point of farthest movement, the optical fibers in the first holes are pressed along the same sidewall of respective first holes.

In an alternative embodiment, an optical fiber clamp of the present invention includes a plurality of wafers each having a plurality of holes formed therethrough, surfaces of the plurality of wafers through which the holes are formed facing each other so that respective holes of the plurality of wafers are aligned. The plurality of wafers are laterally movable with respect to each other to a clamping position whereby an optical fiber placed through respective aligned holes of each of the plurality of wafers is held stationary against sidewalls of the respective aligned holes.

For example, the optical fiber clamp may include three wafers, whereby the middle wafer is laterally movable with respect to the other wafers which are stationary. As such, sidewalls of the holes formed in the middle wafer may be covered with a compliant material. The compliant material may comprise one of rubber or plastic.

The holes of the plurality of wafers may be diamond-shaped, triangular-shaped, or rectangular-shaped.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention uses a multiple fiber array clamp design to address the shortcomings of conventional techniques, through the use of lithographically defined features etched into silicon wafers or substrates. These features are large enough to easily receive a plurality of optical fibers, and can be aligned into an (M×N) array of optical fibers with a required level of precision. In this description, M and N are integers than may be the same or different.

The features in the silicon wafers may be diamond shaped holes that are etched entirely through the silicon wafer and that have vertical sidewalls. The location of these features is controlled by lithographic precision. Feature size is highly uniform and multiple features may easily be generated to accommodate numerous fibers.

In principle, virtually any number of fibers could be accommodated in this arrangement with alignment tolerance on the order of 1 $\mu$m. Manufacturing tolerances that limit existing techniques are eliminated and assembly is simplified by the reduction of components used to hold, locate and align the fibers.

Figure 3:
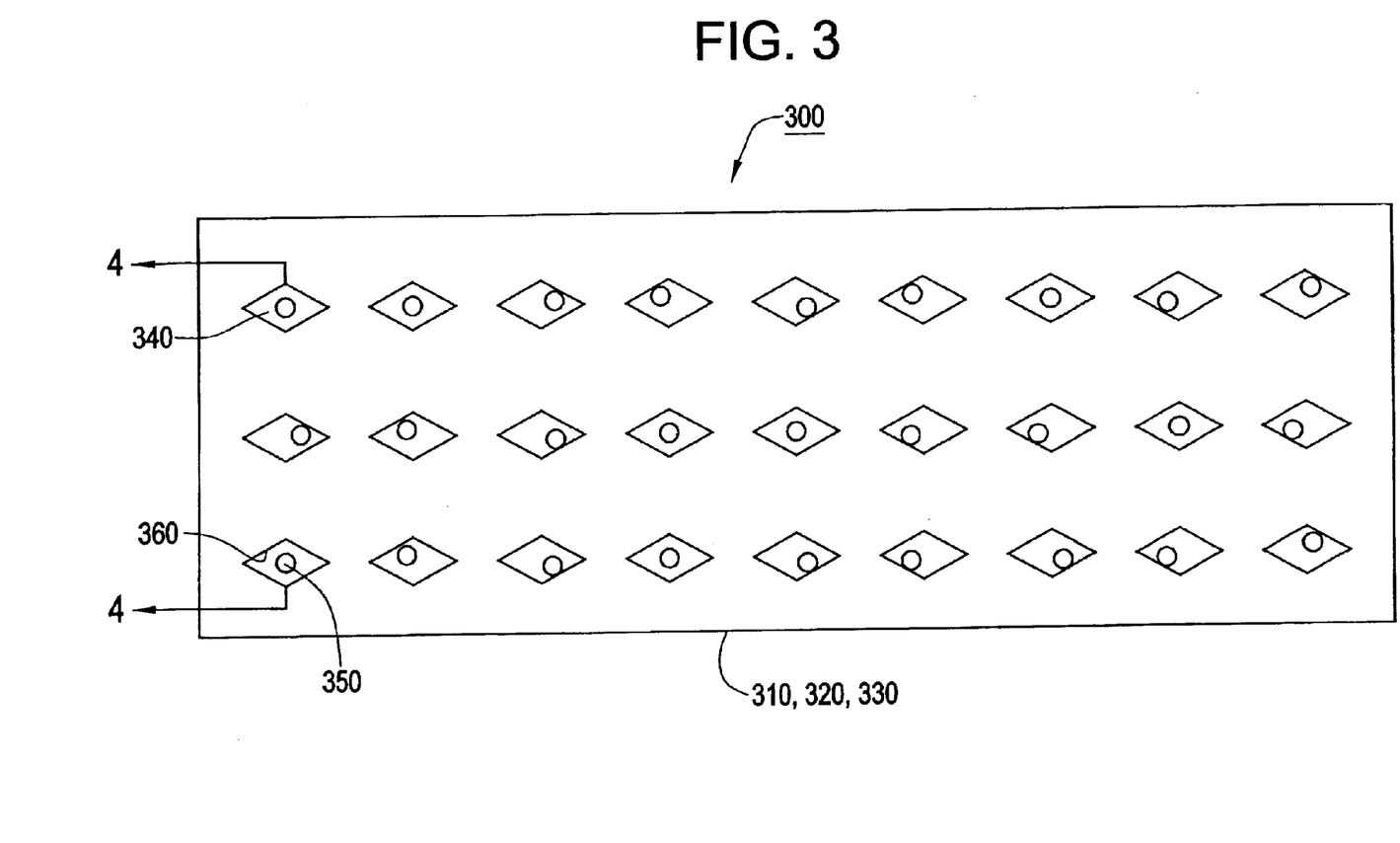
FIG. 3 is an overhead view of a multi-dimensional optical fiber alignment system having an (M×N) array of optical fibers according to an embodiment of the present invention, in an optical fiber placement position.
Figure 4:
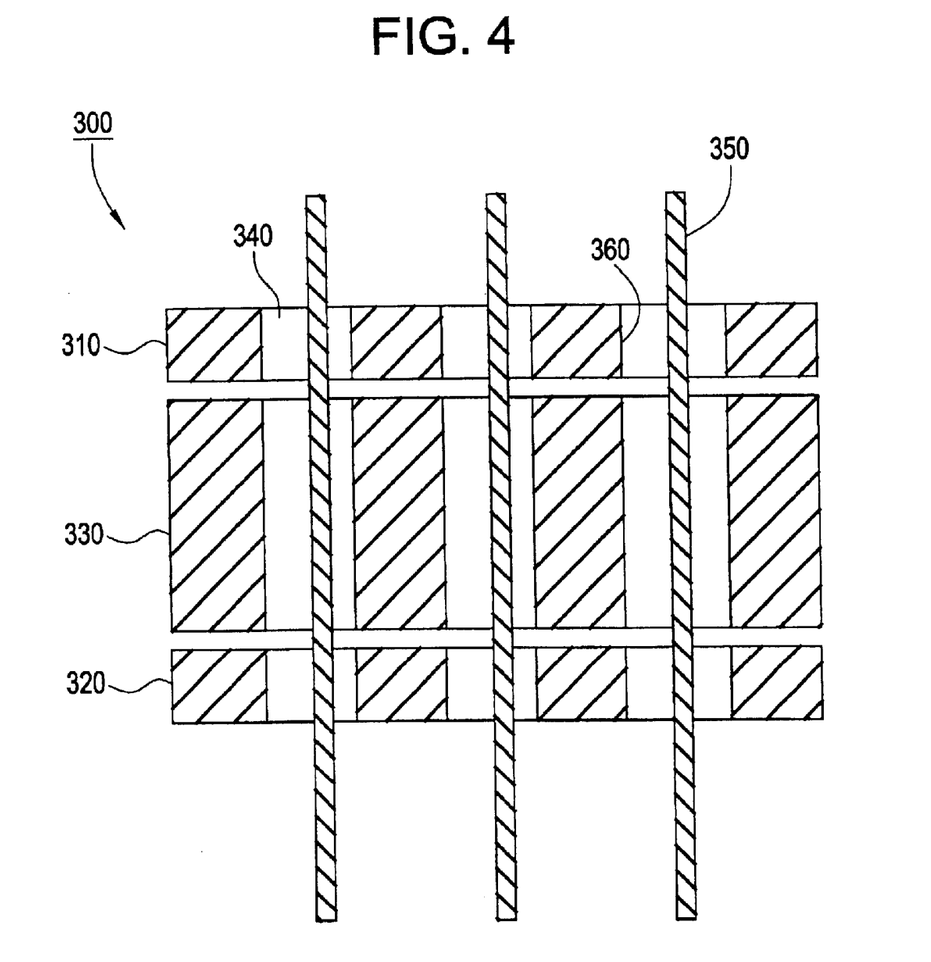
FIG. 4 is a side view of the multi-dimensional optical fiber alignment system of FIG. 3, in the optical fiber placement position.

FIGS. 3 through 6 illustrate a multi-dimensional optical fiber alignment system having an (M×N) array of optical fibers according to an embodiment of the present invention. FIG. 3 is an overhead view of the multi-dimensional optical fiber alignment system in an optical fiber placement position, and FIG. 4 is a side view of the multi-dimensional optical fiber alignment system of FIG. 3 in the optical fiber placement position. It is to be understood that the optical fiber placement position is an initial position prior to a final clamping position.

As shown in FIGS. 3 and 4, the system includes an upper wafer 310, a lower wafer 320, and a center wafer 330. Each of the wafers 310, 320, and 330 are etched or processed to include an identical array of diamond-shaped features 340 that pass through the respective wafers 310, 320, and 330. The diamond-shaped features 340 should have smooth sidewalls.

Figure 9:
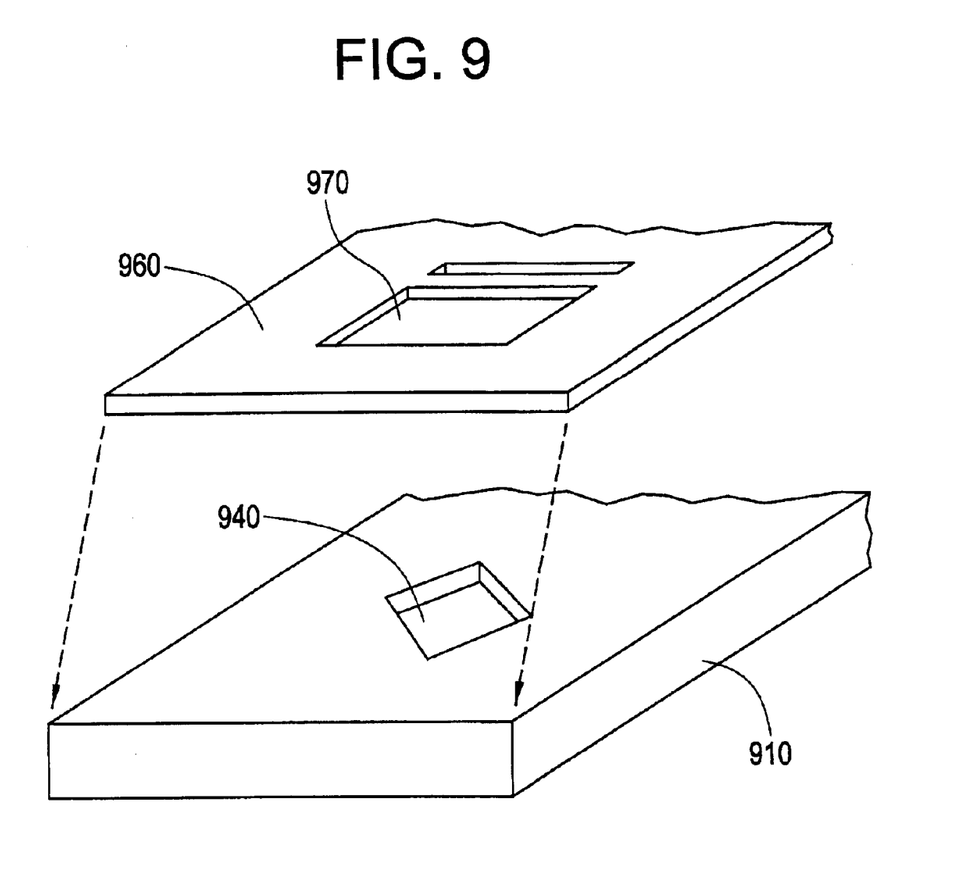
FIG. 9 is an overhead view of a wafer having a compliant structure bonded to a top surface thereof

Also, the sidewalls of the diamond-shaped features 340 in center wafer 330 may be coated with a compliant material 360 such as rubber or plastic, for reasons as will be subsequently described. Alternatively, a compliant structure 960 such as rubber or plastic for example, may be bonded on the facing surface of wafer 910, as shown in FIG. 9. Opening 970 in compliant structure 960 is aligned to coincide with feature 940 when compliant structure 960 is bonded to the facing surface of wafer 910. It should be understood that a corresponding optical fiber placed through feature 940 extends out through opening 970 of compliant structure 960.

In operation, the wafers 310, 320, and 330 are placed into an assembly fixture that is used to align the top and bottom wafers, and to move the middle wafer with respect to the top and bottom wafers. The alignment fixture may for example comprise a set of fixed locating pins and a set of movable locating pins, that register the gross alignment features for each wafer. The movable locating pins may for example be controlled by a mechanical micrometer that is mounted onto a precision x-y stage, or by any device that can control the movement of the center wafer 330 to a desired tolerance.

In an optical fiber placement position, the wafers 310, 320, and 330 are aligned in the assembly fixture such that the diamond-shaped features 340 on each wafer are in complete alignment. Optical fibers 350 are then inserted through the diamond-shaped features 340 in all three wafers 310, 320, and 330.

Once all of the fibers 350 are inserted through the diamond-shaped features 340, the center wafer 330 in the stack is moved using the movable locating pins in the assembly fixture to guide the individual fibers 350 into a clamping position. This is accomplished by registering each fiber in the array against the corner of the diamond-shaped features in the top and bottom wafers 310 and 320.

Initially, the fibers will press up against the corner of the center wafer 330 as it moves laterally. But as the lateral movement continues toward the final clamping position, the fibers 350 become wedged between the corners of the diamond-shaped features 340 in the upper and lower wafers 310 and 320, and the corners of the diamond-shaped features 340 in the center wafer 330.

Figure 5:
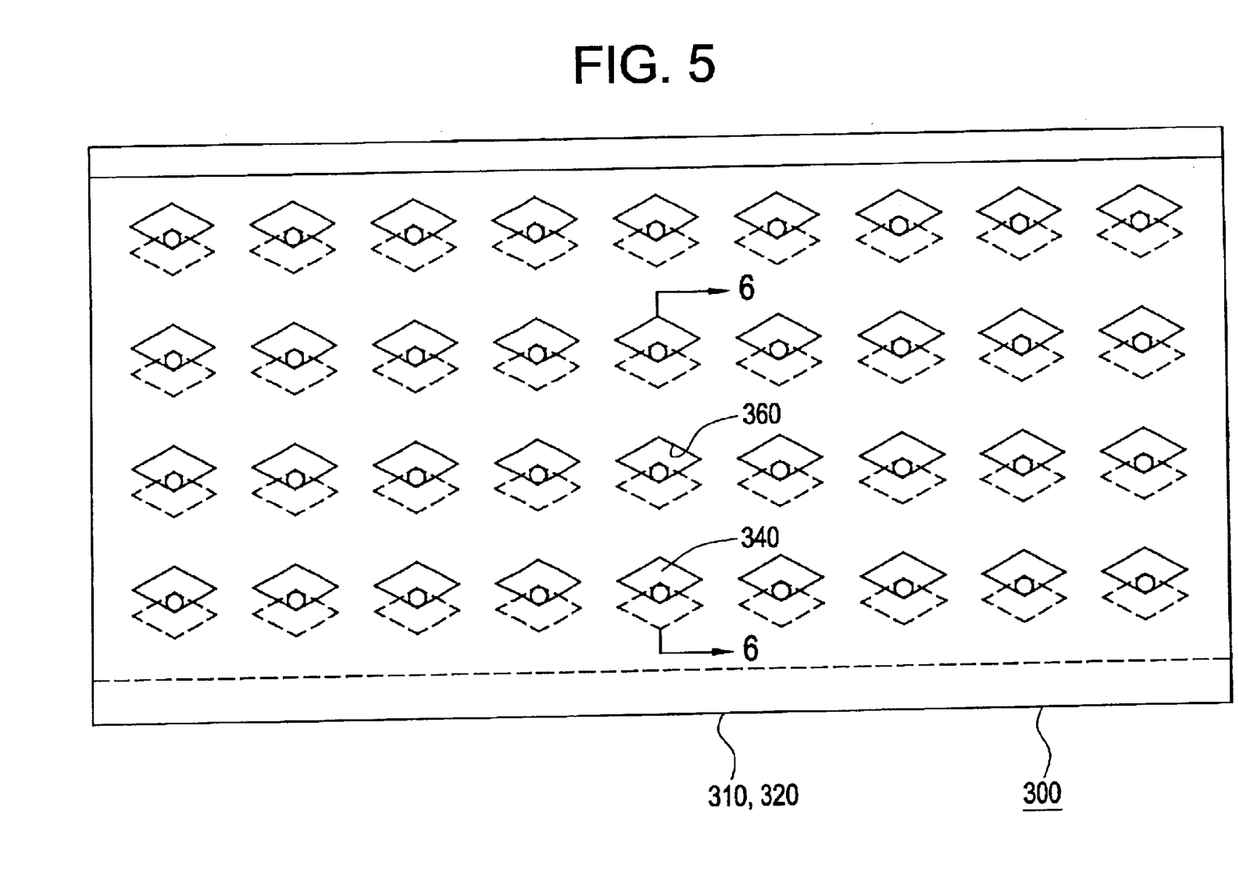
FIG. 5 is an overhead view of the multi-dimensional optical fiber alignment system as in FIG. 3, in an optical fiber clamping position.
Figure 6:
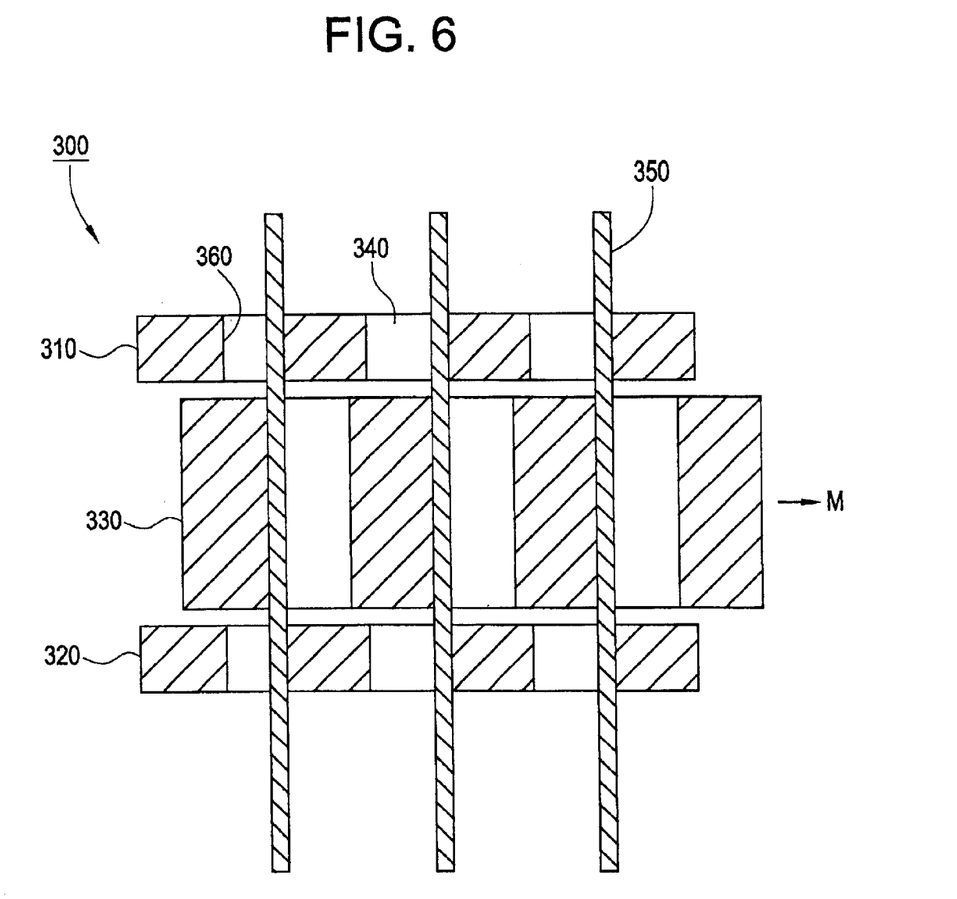
FIG. 6 is a side view of the multi-dimensional optical fiber alignment system of FIG. 5, in the optical fiber clamping position.

FIG. 5 is an overhead view of the multi-dimensional optical fiber alignment system of the preferred embodiment, in an optical fiber clamping position, and FIG. 6 is a side view of the multi-dimensional optical fiber alignment system of FIG. 5 in the optical fiber clamping position. It is to be understood that the optical fiber clamping position corresponds to a finally clamped position.

As shown in FIGS. 5 and 6, in the clamping position, the center wafer 330 is moved to the side in the direction M, pushing the fibers 350 into place. Once the fibers 350 are pressed between the diamond-shaped features 340 in the upper and lower wafers 310 and 320, and those of the center wafer 330, they are all aligned and clamped quickly and accurately. By moving the wafer 330, the system 300 effectively reduces the overlap size of the diamond-shaped features to one that offers a snug fit for the optical fibers 350. This makes certain that the fibers 350 will be aligned and clamped to the desired tolerance.

Once properly aligned and clamped, the optical fibers 350 can be glued into place with a staking or potting adhesive, solder or other permanent fixing mechanism. Then the fibers can be cut, the end face of the middle wafer can be properly polished, and any other finishing processes can be performed on the aligned bottom wafer.

The diamond-shaped features 340 can be formed in the wafers 310, 320, and 330 by any means desired. <110> silicon wafers can be easily etched to form these diamond-shaped features. However, if a Bosch inductively coupled plasma (ICP) dry etch process is used, such features 340 can be formed on any kind of silicon, regardless of its crystalline orientation.

The diamond-shaped features 340 may be larger than the diameter of the optical fibers 350, but are not necessarily limited as being larger. Also the diamond-shaped features may be significantly larger than the diameter of the optical fibers 350. This allows for easy insertion of optical fibers when the system is in the optical fiber placement position. However, the size of the diamond-shaped features 340 becomes irrelevant with respect to the clamping phase, as the overlap of these features 340 in the various wafers 310, 320, and 330 is reduced to just the diameter of the optical fibers. As a result, it is not necessary to thread a large number of fibers through tiny holes during the initial placement of the optical fibers.

The use of a compliant material 360 on the sidewalls of the diamond-shaped features 340 in center wafer 330 as shown in FIG. 5, relieves any undue stress that may be placed on particular ones of the fibers 350 that first contact with the sidewalls of respective ones of the diamond-shaped features 340 of the upper and lower wafers 310 and 320, for example. Due to imperfect tolerances between the features 340 and the fibers 350, some of the fibers 350 may contact the sidewalls of respective features 340 before other fibers contact sidewalls of respective features. The compliant material 360 compresses when the fibers 350 come into contact with it, so that when the center wafer 330 is further moved, all of the fibers can ultimately make contact with respective features and the pressure exerted by the wafers may be spread evenly to all of the fibers. Compliant structure 960 of FIG. 9, as bonded to the facing surface of center wafer 330 of FIG. 5 for example, similarly relieves any undue stress that may be placed on the fibers, by compressing upon contact with a fiber along the inner edge of opening 970. The compliant material 360 and compliant structure 960 are not necessary, but may increase the effectiveness of the clamping process.

Although the features 340 have been described as diamond-shaped, the features are not limited in shape. All that is necessary is that the shape of the features is such that when the upper, lower, and center wafers 310, 320, and 330 are shifted with respect to each other, the fibers 350 will each be pressed together to a single point of alignment. For example, the features 340 in the upper and lower wafers 310 and 320 may be triangular, while the features 340 in the center wafer 330 may be square. In the alignment position, the fibers 350 must be pressed into a single position by at least three sidewalls of the various features through which they are placed.

Figure 7:
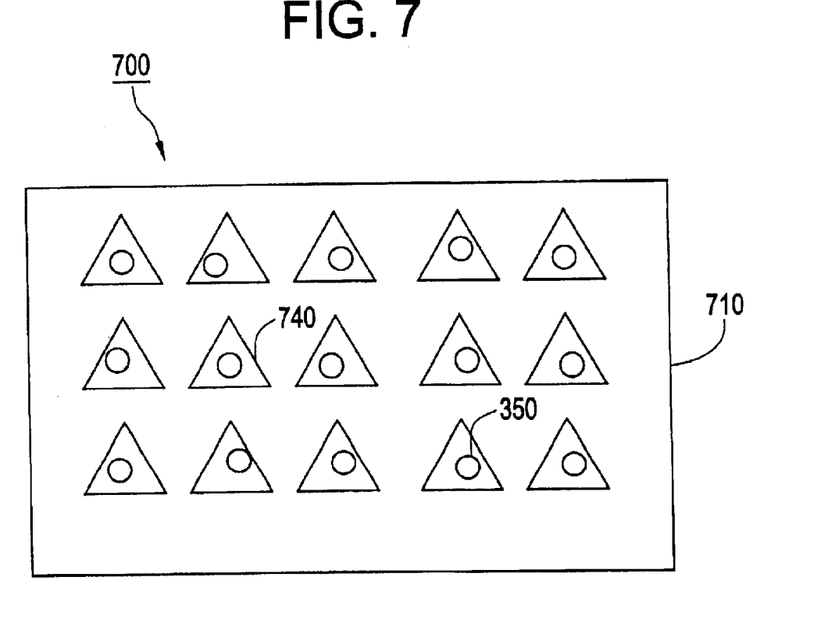
FIG. 7 is a top view of a wafer of a further embodiment in which the features are triangular-shaped.
Figure 8:
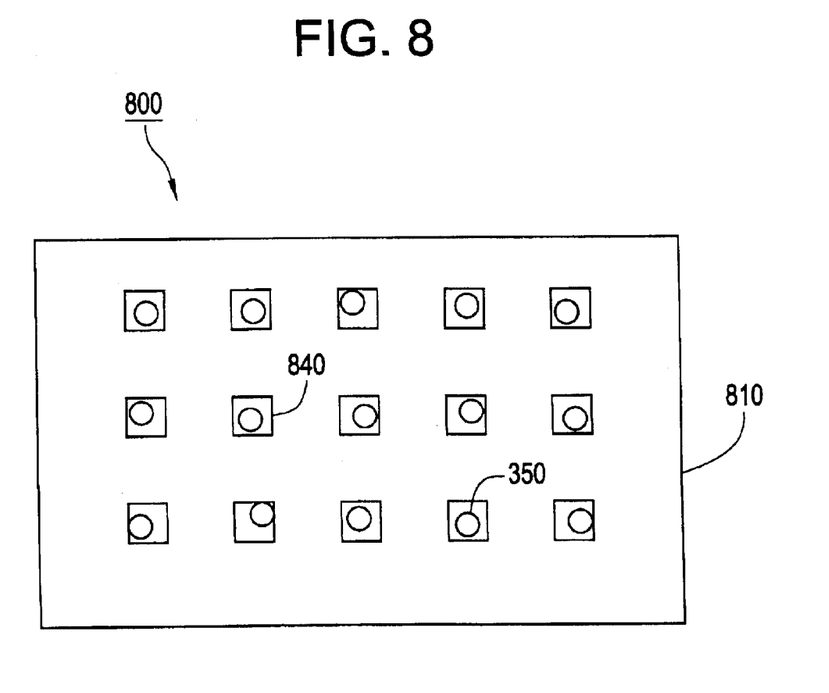
FIG. 8 is a top view of a wafer of a still further embodiment in which the features are rectangular-shaped.

FIG. 7 is a top view of a wafer 710 of a multi-dimensional optical fiber alignment system 700 of a further embodiment, in which the features 740 are triangular-shaped. FIG. 8 is a top view of a wafer 810 of a multi-dimensional optical fiber alignment system 800 of a still further embodiment, in which the features 840 are rectangular-shaped. Different shapes in alternate embodiments are also possible, wherein for example the center wafer may have features of a first shape and the upper and lower wafers have respectively different shapes.

In addition, although three wafers are described in the above embodiments, any number of wafers may be used. For example, either of the upper wafer 310 or the lower wafer 320 may be eliminated. In such further embodiment, the remaining wafers would necessarily be of sufficient thickness to prevent the fibers from becoming cocked or turned when the wafers are moved into the alignment position.

Also, it is not necessary that the center wafer is movable. Although in the above embodiments, the upper and lower wafers 310 and 320 are stationary and the center wafer 330 is movable, such an arrangement of movement may be reversed. The upper and lower wafers 310 and 320 may be movable and the center wafer 330 stationary. Any other arrangement of movement may be applied, as long as features 340 are moved to press the fibers into a single alignment position. It should however be understood that generally, compliant material 360 is coated on sidewalls of the features of wafers that are movable.

Through this invention, arrays of virtually any size can be constructed. The current array is provided solely as an example and should not be construed as limiting. Using current processing techniques, it is possible to create identical patterns in wafers 310, 320, and 330 with great precision. As a result, the device has good tolerance in both horizontal and vertical directions. Furthermore, since the features are defined lithographically, scaling of the structure to add additional fiber locations can be easily accommodated and does not affect the alignment precision or process.

By this system and method, an array that realizes simple fiber alignment is provided, which eliminates the need to individually align v-grooves formed on wafers. As a result, a greatly improved assembly process is provided. Furthermore, the structure is mechanically strong. By supporting the fibers with a three wafer stack of silicon wafers, rather than a single wafer, improved strength is realized. In addition, by forming all of the fibers in a single array, the structure allows for gang polishing of all of the fiber endfaces and simultaneous optical coating of all fibers in a single fixture. Additionally, uniform angle polishing of fibers may be realized by first staggering the stack of wafers to produce a desired angle, then polishing the fibers, and then realigning the stack to the normal clamp position.

The above embodiments have been described whereby silicon wafers are used in the multiple fiber array clamp. However, the wafers are not necessarily limited as being silicon. For example, the wafers may be metal, plastic, glass, ceramic or any suitable material or substrate that may be appropriately etched or processed to create the corresponding holes or features. Also, locating features can be fabricated in various materials using precision etched silicon as a master, from which suitable molds and molded parts may be fabricated with high precision.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical fiber clamp comprising:

a first wafer having a first surface with a plurality of first holes formed therethrough; and a second wafer having a second surface with a plurality of second holes formed therethrough, the second surface of the second wafer facing the first surface of the first wafer, the first and second wafers being laterally movable with respect to each other to a clamping position, an optical fiber placed through a respective pair of the first and second holes being held stationary against sidewalls of the first and second holes, wherein one of the first and second wafers is laterally movable, and another of the first and second wafers is stationary, and the sidewalls of the holes in the one of the first and second wafers that is laterally movable have a compliant material formed thereon.

2. The optical fiber clamp of claim 1, wherein the compliant material is comprised of rubber.

3. The optical fiber clamp of claim 1, wherein the compliant material is comprised of plastic.

4. The optical fiber clamp of claim 1, further comprising a third wafer having a third surface with a plurality of third holes formed therethrough, the third surface of the third wafer facing one of a surface of the first wafer through which the first holes are formed or a surface of the second wafer through which the second holes are formed, the first, second and third wafers being laterally movable with respect to each other to the clamping position, whereby the optical fiber placed through the respective pair of the first and second holes and a respective one of the third holes is held stationary against the sidewalls of the first and second holes and a sidewall of the respective one of the third holes.

5. The optical fiber clamp of claim 4, wherein the one of the first and second wafers is laterally movable, and the another of the first and second wafers and the third wafer are stationary.

6. The optical fiber clamp of claim 1, wherein the first holes are formed through the first wafer in an array pattern that is identical to an array pattern by which the second holes are formed through the second wafer.

7. The optical fiber clamp of claim 1, wherein the first and second holes are substantially larger than the optical fibers.

8. The optical fiber clamp of claim 1, wherein the first and second holes are diamond-shaped.

9. The optical fiber clamp of claim 1, wherein the first and second holes are triangular-shaped.

10. The optical fiber clamp of claim 1, wherein the first and second holes are rectangular-shaped.

11. The optical fiber clamp of claim 1, wherein the first holes have different shape than the second holes.

12. An optical fiber clamp comprising:

a first wafer having a first surface with a plurality of first holes formed therethrough; and a second wafer having a second surface with a plurality of second holes formed therethrough, the second surface of the second wafer facing the first surface of the first wafer, the first and second wafers being laterally movable with respect to each other to a clamping position, an optical fiber placed through a respective pair of the first and second holes being held stationary against sidewalls of the first and second holes, wherein one of the first and second wafers is laterally movable, and another of the first and second wafers is stationary, the optical fiber clamp further comprising a compliant structure bonded to a surface of the one of the first and second wafers that is laterally movable, the compliant structure having an opening aligned so that the optical fiber placed through the respective pairs of the first and second holes extends through the opening.

13. An optical fiber clamp comprising:

a plurality of wafers each having a plurality of holes formed therethrough, surfaces of the plurality of wafers through which the holes are formed facing each other so that respective holes of the plurality of wafers are aligned, the plurality of wafers being laterally movable with respect to each other to a clamping position, an optical fiber placed through respective aligned holes of each of the plurality of wafers being held stationary against sidewalls of the respective aligned holes, wherein a first of the plurality of wafers is movable and others of the plurality of wafers are stationary, and the sidewalls of the holes in the first of the plurality of wafers have a compliant material formed thereon.

14. The optical fiber clamp of claim 13, wherein the plurality of wafers comprises three or more wafers.

15. The optical fiber clamp of claim 13, wherein the holes are formed through the plurality of wafers in identical arrays.

16. The optical fiber clamp of claim 13, wherein the holes have a shape selected from a group including diamond-shaped, rectangular-shaped, and triangular-shaped.

17. The optical fiber clamp of claim 13, wherein the holes of the first of the plurality of wafers have a different shape than the holes of the others of the plurality of wafers.

18. An optical fiber clamp comprising:

a plurality of wafers each having a plurality of holes formed therethrough, surfaces of the plurality of wafers through which the holes are formed facing each other so that respective holes of the plurality of wafers are aligned, the plurality of wafers being laterally movable with respect to each other to a clamping position, an optical fiber placed through respective aligned holes of each of the plurality of wafers being held stationary against sidewalls of the respective aligned holes, wherein a first of the plurality of wafers is movable and others of the plurality of wafers are stationary, the optical fiber clamp further comprising a compliant structure bonded to a surface of the first of the plurality of wafers, the compliant structure having an opening aligned so that the optical fiber placed through the respective aligned holes extends through the opening.

* * * * *